Figure 1:
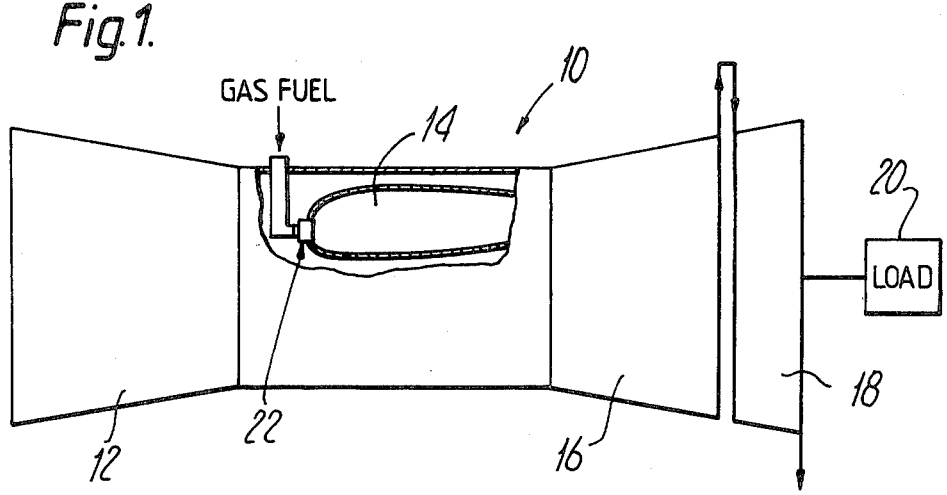

United States Patent [19]

Willis

[11] Patent Number: 4,483,138
[45] Date of Patent: Nov. 20, 1984

[54] GAS FUEL INJECTOR FOR WIDE RANGE OF CALORIFIC VALUES

[75] Inventor: Jeffrey D. Willis, Coventry, England

[73] Assignee: Rolls-Royce Limited, London, England

[21] Appl. No.: 432,823

[22] Filed: Oct. 5, 1982

[30] Foreign Application Priority Data

Nov. 7, 1981 [GB] United Kingdom ............... 8133640

[51] Int. Cl.³ .......................... F02C 3/22; F23R 3/14
[52] U.S. Cl. .................. 60/39.465; 60/737; 60/748; 239/403
[58] Field of Search ............... 60/737, 738, 748, 749, 60/740, 742, 39.463, 39.465; 239/403, 404

[56] References Cited

U.S. PATENT DOCUMENTS

| | | | |
|---|---|---|---|
| 2,920,449 | 1/1960 | Johnson et al. | 60/737 |
| 3,736,746 | 6/1973 | Dubell et al. | 60/737 |
| 3,851,466 | 12/1974 | Verdouw | 60/737 |
| 3,905,192 | 9/1975 | Pierce et al. | 60/737 |
| 3,961,475 | 6/1976 | Wood | 60/742 |
| 4,189,913 | 2/1980 | Carlisle | 60/740 |
| 4,199,934 | 4/1980 | Meyer | 60/749 |
| 4,362,021 | 12/1982 | Willis | 60/749 |
| 4,373,342 | 2/1983 | Willis et al. | 60/748 |

FOREIGN PATENT DOCUMENTS

737702 6/1980 U.S.S.R. ............... 239/404

Primary Examiner—Carlton R. Croyle
Assistant Examiner—Jeffrey A. Simenauer
Attorney, Agent, or Firm—Cushman, Darby & Cushman

[57] ABSTRACT

A gas fuel injector for a gas turbine engine power plant is arranged to reduce the sensitivity of combustion efficiency to variations in gas fuel velocity injector exit at engine idle. The injector comprises a gas fuel duct which discharges gas fuel into a swirler assembly having passages of decreasing cross-sectional area, the passages also receiving a flow of compressor delivery air from the compressor of the power plant. There is an energy interchange between the gas fuel which may have a velocity of between 80 fps to 1000 fps depending on type of fuel, and the air such that the gas and air leave the injector at similar velocities. It has been found that if these velocities are matched, the combustion efficiency is less sensitive to gas velocity and produces higher combustion efficiencies than an arrangement whereby the velocity of the gas entering the system is dictated by the heat input requirements.

5 Claims, 6 Drawing Figures

GAS FUEL INJECTOR FOR WIDE RANGE OF CALORIFIC VALUES

This invention relates to fuel injectors for gas turbine engines, more particularly to fuel injectors designed to inject a range of gaseous fuels having different calorific values into the combustion chamber or chambers of an industrial gas turbine engine.

When such an engine is operating at the idle condition, the combustion efficiency ($\eta$) varies as a function of the gas velocity at the exit of the fuel injector. The plot of combustion efficiency ($\eta$) v. gas fuel velocity (V) exhibits a peak and thus small changes in gas velocity results in large reductions in combustion efficiency.

It has been found that if the velocities of the various gaseous fuels and the compressor delivery air are more nearly matched at the entry to the combustion chamber, the plot of $\eta$v. V at engine idle does not exhibit such a peak and combustion efficiency is less sensitive to gas fuel velocity. The velocity of the gas fuel in the fuel delivery duct varies according to the calorific value and density of the fuel, since the engine must receive the same heat input per unit time irrespective of the type of fuel being used. Thus the mass flow must vary according to which fuel is being used, and since the duct area is fixed, the gas velocity must vary, so high calorific value gases have low discharge velocity from the fuel delivery duct and low calorific value fuels have a high discharge velocity. The gas fuel velocity can vary between approximately 80 fps to 1000 fps, whilst the velocity of the compressor delivery air at engine idle is in the region 400 to 600 fps.

The present invention proposes that the velocities of the various gas fuels and the compressor delivery air are equated or more nearly matched at the entry to the combustion chamber or chambers of the engine by arranging an energy interchange between the fuel and air flows.

This energy interchange can be achieved by mixing the gas fuel and air in a swirler arrangement located centrally in the head of each combustion chamber. The swirler arrangement can comprise a number of swirler vanes and a central pintle which together define a number of curved passages of decreasing cross-sectional area in the direction of flow. These passages receive compressor delivery air from the engine compressor and gas fuel from a fuel delivery duct, the outlet of which is located adjacent or overlapping the upstream end of the pintle, so that the gas fuel initially flows into the radially inner portions of the swirler passages and then mixes with the compressor air in the remainder of the length of each passage. An energy interchange between the two flows takes place so that there tends to be, depending on the velocity difference between the flows, either an increase in the gas velocity, an increase or a decrease in the air velocity, or a combination of these effects. The net result is that at the exit from the swirler passages, which constitutes the entry to the combustion chamber, the gas and air are moving at similar velocities, and have been at least partially mixed.

This arrangement may also include a cuff, or sleeve to improve the flow pattern in the primary zone which is parallel walled and extends from the head of the combustion chamber at the outside diameter of the swirler assembly for a short distance into the combustion chamber. The cuff may have one or more rows of radial holes formed around its circumference. This type of cuff is described and claimed in the Willis et al. U.S. Pat. No. 4,373,342 issued Feb. 15, 1983 to the common assignee Rolls-Royce Limited.

Figure 5:
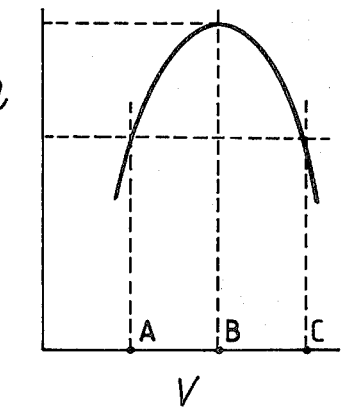
Figure 6:
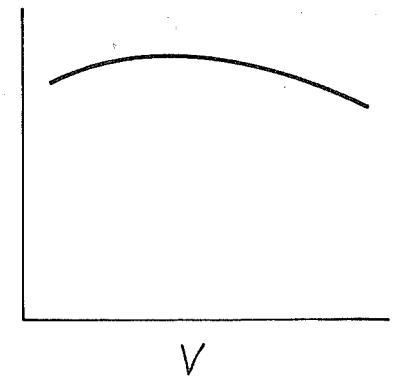
Figure 2:
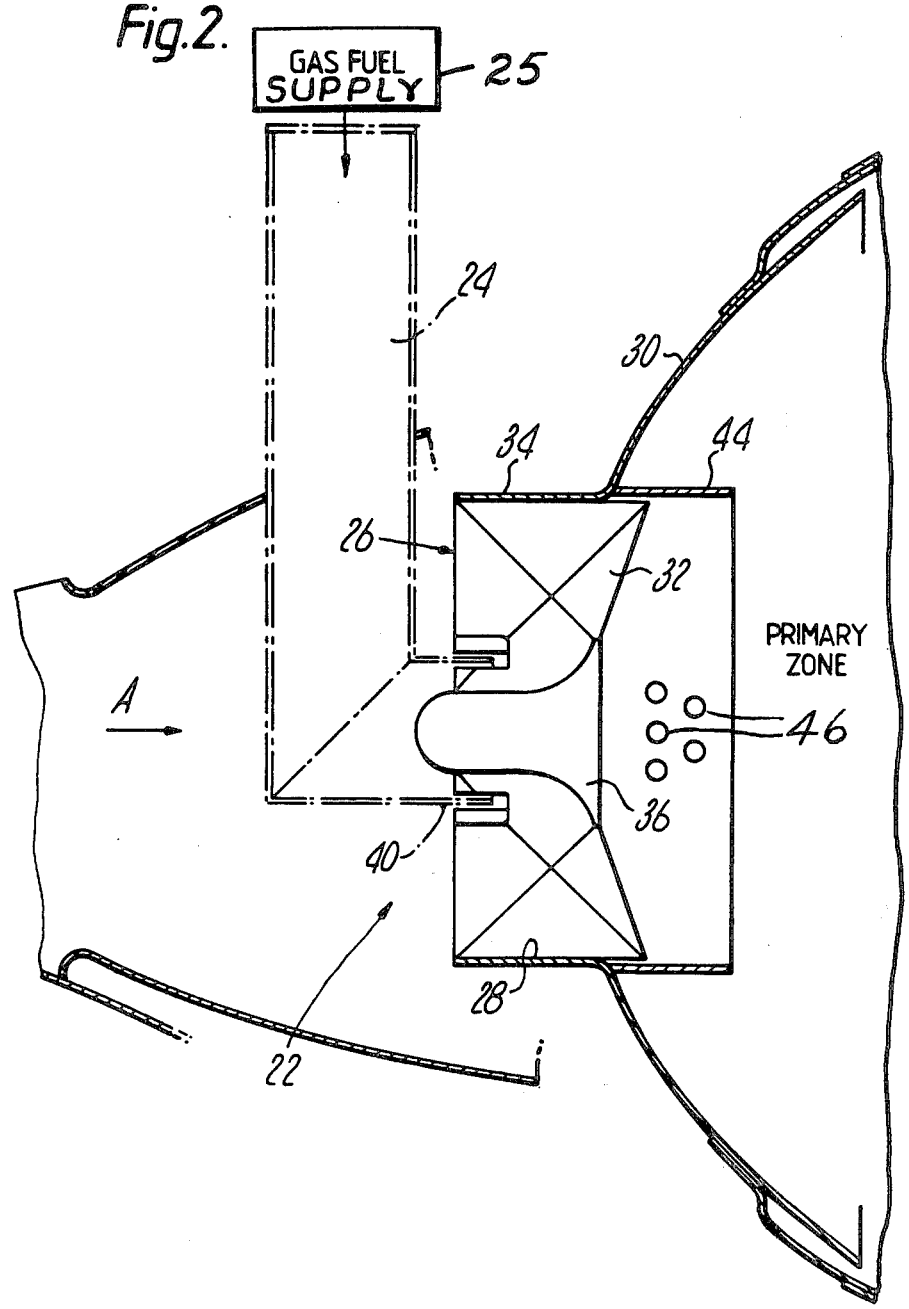
Figure 3:
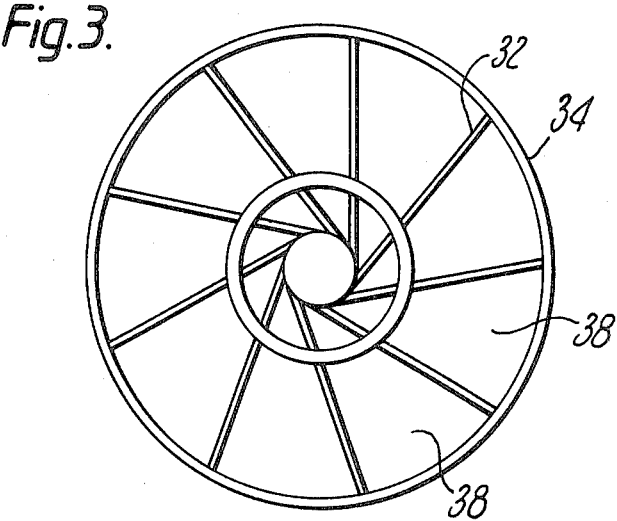
Figure 4:
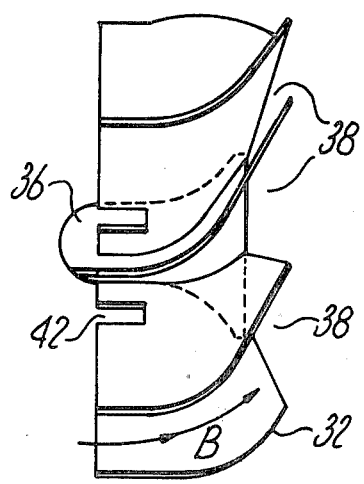

The present invention will now be more particularly described with reference to the accompanying drawings in which FIG. 1 shows a gas turbine engine power plant incorporating one or more fuel injectors according to the present invention, FIG. 2 shows, in greater detail, one of the fuel injectors of FIG. 1, FIG. 3 is apart view on arrow 'A' in FIG. 2, FIG. 4 is a detail in side elevation of part of the swirler and pintle assembly of the fuel injector shown in FIG. 2, FIG. 5 is a typical plot of combustion efficiency ($\eta$) gas fuel velocity (V) at the fuel injector exit at engine idle air conditions without the use of a fuel injector according to the present invention and, FIG. 6 is a typical plot of $\eta$v. V for a combustion chamber at engine idle air conditions using a fuel injector according to the present invention.

Referring to the drawings and, in particular, FIG. 1, a gas turbine engine power plant 10 comprises a compressor 12, supplying compressed air to a number of circumferentially arranged combustion chambers 14, a compressor driving turbine 16 driven by the combustion products of the combustion chambers 14 and a power turbine 18 driving a load 20, the power turbine being driven by the residual energy in the exhaust gases from the turbine 16.

The fuel for the power plant 10 comprises a range of gas fuels having different calorific values and each combustion chamber 14 has a gas fuel injector 22. Referring more particularly to FIGS. 2, 3 and 4, each fuel injector 22 comprises a gas fuel delivery duct 24 which receives the gas fuel from a gas fuel supply shown diagrammatically at 25 in FIG. 2 and a swirler and pintle assembly 26 which for practical reasons is attached in a central opening 28 in the head 30 of the combustion chamber. The assembly 26 could be attached to the duct 24, but such an arrangement would require excessively large openings in the engine casing, and accurate location with the combustion chamber would be difficult.

The assembly 26 comprises an array of equi-spaced curved vanes 32 extending between an outer housing or sleeve 34 and a hub or central pintle 36. The vanes are curved through an angle of approximately 30° though other angles may be used depending upon the degree of swirl required and the sleeve 34 is an extension of the central portion of the head 30. Alternatively the sleeve can be a separate component from the head and can be attached to the head by any suitable means, e.g. brazing.

The vanes 32, the sleeve 34 and the pintle 36 define a number of passages 38 having a cross-sectional area which decreases in the direction of flow, indicated by the arrow B, and because of the curvature of the vanes 32, cause a change in the direction of flow therethrough.

The outlet 40 of the delivery duct 24 is co-axial with the assembly 26 and the end of the outlet is located in slots 42 formed in the radially upstream ends of each of the vanes 32, so that the end of the outlet 40 overlaps the upstream end of the pintle 36.

The power plant 10 is arranged to function on a range of gas fuels of differing densities and calorific values. In order for the heat input per unit time to be maintained at a constant value for any particular engine condition, the mass flows of the different gas fuels through the duct 24 will vary and thus the velocities at the outlet 40 will vary for the different fuels. The velocity variation will generally lie in the range circa 80 fps to circa 1000 fps, with the higher calorific value fuels flowing at lower velocities and the lower calorific value fuels flowing at the higher velocities. The velocity of the compressor delivery air from the compressor 12 at the entry to the assembly 26 is of the order 400 to 600 fps at engine idle.

FIG. 5 illustrates a typical plot of $\eta v$. V indicating that if the V does not lie close to point B and is somewhere in the region of points A or C, the combustion efficiency will be low. In order to attain the optimum efficiency the exit flow area of the gas injector would have to be modified to suit each gas calorific value and density.

In the present arrangement, the velocities of the gas fuel and compressor delivery air are matched or closely matched at or adjacent the downstream end of the swirler and pintle assembly 26. Referring to FIG. 2, the gas fuel which will have a velocity in the range of about 80 fps to 1000 fps depending on calorific value and density, leaves the outlet 40 and enters the radially inner portion of the upstream end of each passage 38, whilst the compressor delivery air will enter the radially outer portion of the upstream end of each passage 38 at a velocity in the region 400 to 600 fps.

The gas fuel tends to merge with the air flow in each passage and there is a general tendency for the flow in each passage to increase in velocity because of the decreasing cross-sectional area of each passage. There is also an energy interchange between the fuel and the air such that depending upon the initial velocity difference, the fuel velocity will increase, the air velocity will increase, or decrease, or there will be a combination of these effects.

Using a fuel injector of the type described above, it has been found that the plot $\eta v$. V at engine idle does not have a peak as shown in FIG. 5 and is much flatter as shown typically in FIG. 6. This characteristic, which is present for a wide range of gas fuels from coal derived gas at 100 BTU/scf to propane at 2316 BTU/scf, means that acceptable combustion efficiencies are more easily obtained from a single design standard.

A cuff or sleeve 44 which extends into the primary zone of the combustion chamber 14, either with or without one or more rows of holes 46, may be included with the swirler assembly 26, to improve the flow pattern in the primary zone. Such a cuff is described and claimed in the aforementioned U.S. Pat. No. 4,373,342.

I claim:

1. A combustion system for a gas turbine engine having air compressor means, combustion means and turbine means in a flow series, said combustion system being capable of use with gas fuels having a range of calorific values and comprising:
    a combustion chamber having a primary zone at an upstream end thereof;
    a gas fuel supply;
    a gas fuel duct communicating with said gas fuel supply and having an outlet;
    a gas fuel injector, said gas fuel injector including a swirler assembly having upstream and downstream ends and arranged to receive a flow of compressed air from said compressor means and a flow of gas fuel from said outlet of said gas duct, said swirler assembly including an outer housing having upstream and downstream ends, an inner hub concentric with and spaced from said outer housing, said hub having upstream and downstream ends, and a plurality of swirler vanes positioned between said outer housing and said inner hub, said vanes having outer upstream and downstream portions and inner upstream and downstream portions, said outer housing, said inner hub and said swirler vanes defining a plurality of passages of decreasing cross-sectional area in a direction of flow therethrough, said outlet of said gas fuel duct being greater in diameter than said upstream end of said hub and smaller in diameter than said upstream end of said housing and terminating between said upstream and downstream ends of said swirler assembly, said gas fuel duct, said hub and said inner upstream portion of said vanes forming gas fuel flow passages, and said gas fuel duct, said housing and said outer upstream portions of said vanes forming compressed air flow passages, and said housing, said hub and said downstream portions of said vanes forming flow passages for mixing gas fuel and air to cause an energy interchange therebetween whereby the gas fuel and air are moving at similar velocities.

2. A combustion system as claimed in claim 1 in which said outer housing comprises a parallel walled sleeve and in which said hub comprises a pintle having an increasing cross-sectional area in a downstream direction, said pintle terminating in a bluff base.

3. A combustion system as claimed in claim 1 in which said vanes have slots formed on upstream edges of the same, said slots receiving said outlet of said gas fuel duct.

4. A combustion system as claimed in claim 1 in which said swirler assembly is integrally attached to said combustion chamber, and said fuel duct is mounted independently of said swirler assembly.

5. A combustion system as claimed in claim 1 including a parallel walled sleeve extending downstream from said outer housing of said swirler assembly, said sleeve extending into said primary zone of said combustion chamber.

* * * * *